Wm Miller
Animal Trap
No. 74842   Patented Feb. 25, 1868

WITNESSES.
H. C. Ashkettle
J. A. Fraser

INVENTOR.
Wm Miller
per
Munn & Co.
Attorneys.

United States Patent Office.

WILLIAM MILLER, OF CHICOPEE, MASSACHUSETTS, ASSIGNOR TO HIMSELF AND JOHN BOYLE, OF ERIE, PENNSYLVANIA.

*Letters Patent No.* 74,842, *dated February* 25, 1868.

IMPROVED ANIMAL-TRAP.

*The Schedule referred to in these Letters Patent and making part of the same.*

TO ALL WHOM IT MAY CONCERN:

Be it known that I, WILLIAM MILLER, of Chicopee, in the county of Hampden, and State of Massachusetts, have invented a new and useful Improvement in Animal-Trap; and I do hereby declare that the following is a full, clear, and exact description thereof, which will enable others skilled in the art to make and use the same, reference being had to the accompanying drawings forming part of this specification.

Similar letters of reference indicate corresponding parts.

My invention has for its object to furnish a neat, simple, and effective means for catching rats, mice, and other animals, and it consists in the combination and arrangement of the various parts, as hereinafter more fully described.

Figure 1:
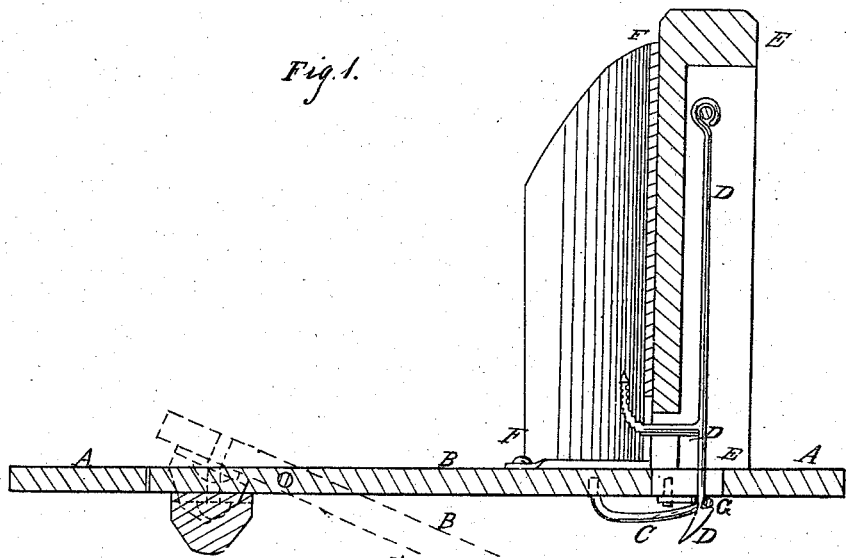
Figure 1 is a vertical longitudinal central section of the upper part of my improved trap, taken through the line $x\ x$, fig. 2.
Figure 2:
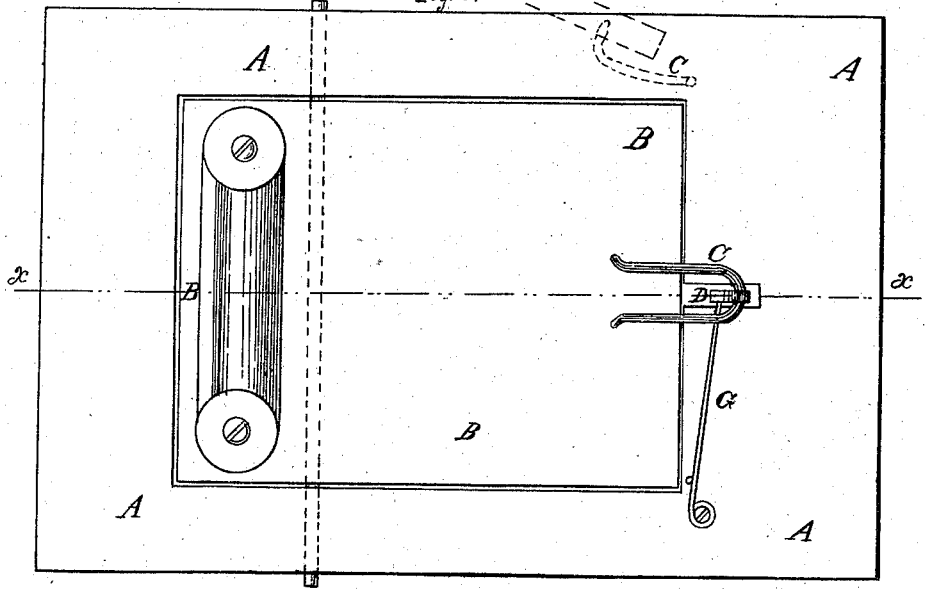
Figure 2 is an under side view of the top of the trap.

A is the top of the trap, which may be placed over a close box, a water-reservoir, or other receptacle, according as it is desired to keep or destroy the animals caught. In the central part of the top or cover A is formed a rectangular hole or opening, in which is pivoted a drop-door, B. The door B is pivoted near its rear end, which said rear end is weighted, so as to bring the said door again into a horizontal position as soon as the animal has been precipitated into the receptacle. To the forward end of the door B is attached a loop or catch, C, which catches upon the spring-catch D, and holds the door B firmly until released by the withdrawal of said spring-catch in the manner hereinafter described. To the top or cover A, in front of and close to the central part of the forward end of the drop-door B, is attached a short standard or post, E, the lower part of which is slotted for the reception of the catch D, the upper end of which is pivoted in the upper part of said slot, as shown in fig. 1. To the lower part of the catch D is attached, or upon it is formed, the bait-hook, $d'$, which projects through an opening in the standard E, so as to be over the forward end of the door B. By this arrangement, as the animal takes hold of the bait, and draws it towards him, he draws the catch D from the loop C, and is at once precipitated through the opening into the receiver placed beneath it. F is a guard-plate, attached at its middle part to the post or standard E, and which curves inward over the forward corners of the door B, so as to compel the animal, when approaching the bait, to stand upon the door B in the most favorable position for being precipitated into the receiver upon the dropping of said door. The lower corners of the curved guard-plate F are secured to the top, A, at the sides of the door B, as shown in fig. 1. G is a spring, one end of which is attached to the under side of the top, A, in such a position that its free end may rest against the rear side of the catch D, to again bring it forward into position to catch upon the loop or catch C, attached to the door B, and hold it securely until again released by another animal pulling upon the bait.

I claim as new, and desire to secure by Letters Patent—

The combination and arrangement of the weighted drop-door B, loop or catch C, pivoted catch D, having a bait-hook, $d'$, formed upon or attached to it, spring G, standard or post E, and curved guard-plate F, with each other and with the top or cover A, substantially as herein shown and described, and for the purpose set forth.

WILLIAM MILLER.

Witnesses:
GEO. W. GUNNISON.